(12) United States Patent
Kakizaki

(10) Patent No.: US 9,793,843 B2
(45) Date of Patent: Oct. 17, 2017

(54) CONTROL DEVICE FOR DETECTING DISCONNECTION

(75) Inventor: Tsuneyasu Kakizaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/415,303

(22) PCT Filed: Jul. 20, 2012

(86) PCT No.: PCT/JP2012/068477
§ 371 (c)(1),
(2), (4) Date: Jan. 16, 2015

(87) PCT Pub. No.: WO2014/013614
PCT Pub. Date: Jan. 23, 2014

(65) Prior Publication Data
US 2015/0188473 A1    Jul. 2, 2015

(51) Int. Cl.
*H02P 21/00* (2016.01)
*H02P 27/06* (2006.01)
(Continued)

(52) U.S. Cl.
CPC ............ *H02P 21/0096* (2013.01); *H02P 5/74* (2013.01); *H02P 6/12* (2013.01); *H02P 21/50* (2016.02);
(Continued)

(58) Field of Classification Search
CPC .... H02P 21/0035; H02P 21/06; H02P 21/146; H02P 2207/05; H02P 21/0096; H02P 6/12; Y02T 10/643
(Continued)

(56) References Cited

U.S. PATENT DOCUMENTS

| 6,462,491 B1 * | 10/2002 | Iijima ....................... H02P 9/18 318/400.09 |
| 7,385,365 B2 | 6/2008 | Feick |
| 8,791,715 B2 | 7/2014 | Abel et al. |

FOREIGN PATENT DOCUMENTS

| DE | 10 2008 055 012 A1 | 6/2010 |
| JP | 5-4788 U | 1/1993 |

(Continued)

OTHER PUBLICATIONS

International Search Report (PCT/ISA/210) dated Sep. 11, 2012, by the Japanese Patent Office as the International Searching Authority for International Application No. PCT/JP2012/068477.
(Continued)

*Primary Examiner* — Kawing Chan
*Assistant Examiner* — Bradley Brown
(74) *Attorney, Agent, or Firm* — Buchanan Ingersoll & Rooney PC

(57) ABSTRACT

A voltage controller generates a d-axis voltage command value and a q-axis voltage command value on the basis of a drive command signal and a three-phase current. When the state in which the absolute value of the resultant vector of the d-axis voltage command value and the q-axis voltage command value is not within a set predetermined range continues for a predetermined time or longer, a disconnection detector determines that a disconnection between a power converter and an AC motor has occurred. A gate controller transmits a gate command for turning off a switching element provided in the power converter to the power converter when the disconnection detector determines that a disconnection between the power converter and the AC motor has occurred.

4 Claims, 2 Drawing Sheets

(51) Int. Cl.
*H02P 5/74* (2006.01)
*H02P 6/12* (2006.01)
*H02P 29/024* (2016.01)
*H02P 29/032* (2016.01)
*H02P 21/06* (2016.01)
*H02M 7/5387* (2007.01)
*H02P 31/00* (2006.01)

(52) U.S. Cl.
CPC .......... *H02P 27/06* (2013.01); *H02P 29/0243* (2016.02); *H02P 29/032* (2016.02); *H02M 2007/53876* (2013.01); *H02P 21/06* (2013.01); *H02P 31/00* (2013.01)

(58) Field of Classification Search
USPC .................................................. 318/400.02
See application file for complete search history.

(56) References Cited

FOREIGN PATENT DOCUMENTS

| | | |
|---|---|---|
| JP | 6-245301 A | 9/1994 |
| JP | 2003-230283 A | 8/2003 |
| JP | 2003-304634 A | 10/2003 |
| JP | 2005-176571 A | 6/2005 |
| JP | 2005176571 A * | 6/2005 |
| JP | 2006-50707 A | 2/2006 |
| JP | 2006-203958 A | 8/2006 |
| JP | 2006203958 A * | 8/2006 |
| JP | 2010-233343 A | 10/2010 |
| JP | 2011-139559 A | 7/2011 |
| JP | 2011139559 A * | 7/2011 |
| JP | 2012-29347 A | 2/2012 |
| JP | 2012029347 A * | 2/2012 |
| WO | 03/069768 A1 | 8/2003 |
| WO | 2005/014329 A1 | 2/2005 |
| WO | WO 2005014329 A1 * | 2/2005 ................ B60L 3/12 |

OTHER PUBLICATIONS

Written Opinion (PCT/ISA/237) dated Sep. 11, 2012, by the Japanese Patent Office as the International Searching Authority for International Application No. PCT/JP2012/068477.

Notification of Reason for Rejection From the Japan Patent Office dated Mar. 12, 2013, in Japanese Patent Application No. 2013-504042, 6 pages, with English Translation.

Office Action dated Apr. 29, 2016, by the German Patent Office in corresponding German Patent Application No. 11 2012 006 581.6, with an English translation of the Office Action. (8 pages).

\* cited by examiner

CONTROL DEVICE FOR DETECTING DISCONNECTION

TECHNICAL FIELD

The present disclosure relates to a control device that controls a power converter that converts power for driving an electric motor, and detects a disconnection between the power converter and the electric motor.

BACKGROUND ART

An electric train runs by converting power taken in from an overhead line by a current collector with a power converter, and driving an electric motor with the converted power. When a disconnection between the power converter and the electric motor occurs, power can no longer be supplied to the electric motor, and the electric train loses traction. Also, when a single power converter supplies power to multiple electric motors, if the power converter continues to operate in a state in which a disconnection has occurred between the power converter and one of the electric motors, the voltage applied to the other electric motors rises, and there is a risk of electric motor failure due to overloading the other electric motors. Accordingly, it is necessary to detect disconnections occurring between a power converter and an electric motor.

In the drive control device disclosed in Patent Literature 1, the drive control device computes an average value of a three-phase current output to an electric motor, and when the difference between the average value and each of the phase currents exceeds a set value, the drive control device determines that a cable for supplying that phase current is disconnected. The power conversion device disclosed in Patent Literature 2 determines that a disconnection between a power converter and an electric motor has occurred when the variation in the output current of the power converter exceeds a set value, and additionally, the minimum value of the output current falls below a set value.

The electric train control device disclosed in Patent Literature 3 determines that a disconnection between a power converter and an electric motor has occurred when the variation in the torque of the electric motor exceeds a set value. The electric motor driving device disclosed in Patent Literature 4 determines whether or not a disconnection between an output circuit and an electric motor has occurred on the basis of each phase voltage output by the output circuit within a set time after activation. With the technology disclosed in Patent Literature 5, it is determined whether or not a disconnection between the arm of each phase and an electric motor has occurred on the basis of a middle point voltage of the arm of each phase of a power converter before the electric motor starts up.

CITATION LIST

Patent Literature

Patent Literature 1: Unexamined Japanese Patent Application Kokai Publication No. H6-245301
Patent Literature 2: Unexamined Japanese Patent Application Kokai Publication No. 2003-304634
Patent Literature 3: Unexamined Japanese Patent Application Kokai Publication No. 2005-176571
Patent Literature 4: Unexamined Japanese Patent Application Kokai Publication No. 2006-50707
Patent Literature 5: Unexamined Japanese Patent Application Kokai Publication No. 2010-233343

SUMMARY OF INVENTION

Technical Problem

The drive control device disclosed in Patent Literature 1 is unable to detect a disconnection when the cables for all three phases are disconnected, because the symmetry of the three-phase current is not lost, and the difference between the average value of the three-phase current and each phase current does not exceed the set value. Similarly, the power conversion device disclosed in Patent Literature 2 is unable to detect a disconnection when the cables for all three phases are disconnected, because the variation in the output current of the power converter does not exceed the set value.

The electric train control device disclosed in Patent Literature 3 requires a torque calculation circuit, and the circuitry becomes more complicated. Similarly, the electric motor driving device disclosed in Patent Literature 4 requires a monitor that detects the voltage supplied to the electric motor, and the circuitry becomes more complicated. With the technology disclosed in Patent Literature 5, a disconnection cannot be detected after the electric motor starts up.

The present disclosure was devised in light of circumstances like the above, and an objective thereof is to improve the accuracy of detecting a disconnection between a power converter and an electric motor with a simple configuration.

Solution to Problem

In order to achieve the above objective, a control device according to the present disclosure is equipped with a power converter, a current detector, a voltage controller, a disconnection detector, and a gate controller. The power converter converts input power and drives an alternating current (AC) motor by turning a switching element on and off. The current detector detects a current that the power converter outputs to the AC motor. The voltage controller generates voltage command values to use for control of the power converter, on the basis of a drive command that commands rotating operation of the AC motor, and the current detected by the current detector. The disconnection detector acquires an angular velocity of the AC motor and determines that a disconnection between the power converter and the AC motor has occurred if a state in which, during a period from when the AC motor starts up until an absolute value of a resultant vector of the voltage command values reaches a value determined according to a maximum value of voltage that the power converter is able to output, the absolute value is not in a predetermined range continues for a predetermined time or longer. The predetermined range is a function of the angular velocity. An upper limit value of the predetermined range is a value obtained by multiplying, with a predetermined value, the absolute value when the AC motor is driven while in a state in which a disconnection between the power converter and the AC motor has not occurred. The gate controller outputs a gate command for controlling the turning on and off of the switching element provided in the power converter, on the basis of the voltage command values.

Advantageous Effects of Invention

According to the present disclosure, it becomes possible to improve the accuracy of detecting a disconnection between a power converter and an electric motor with a simple configuration.

DESCRIPTION OF EMBODIMENT

Figure 1:
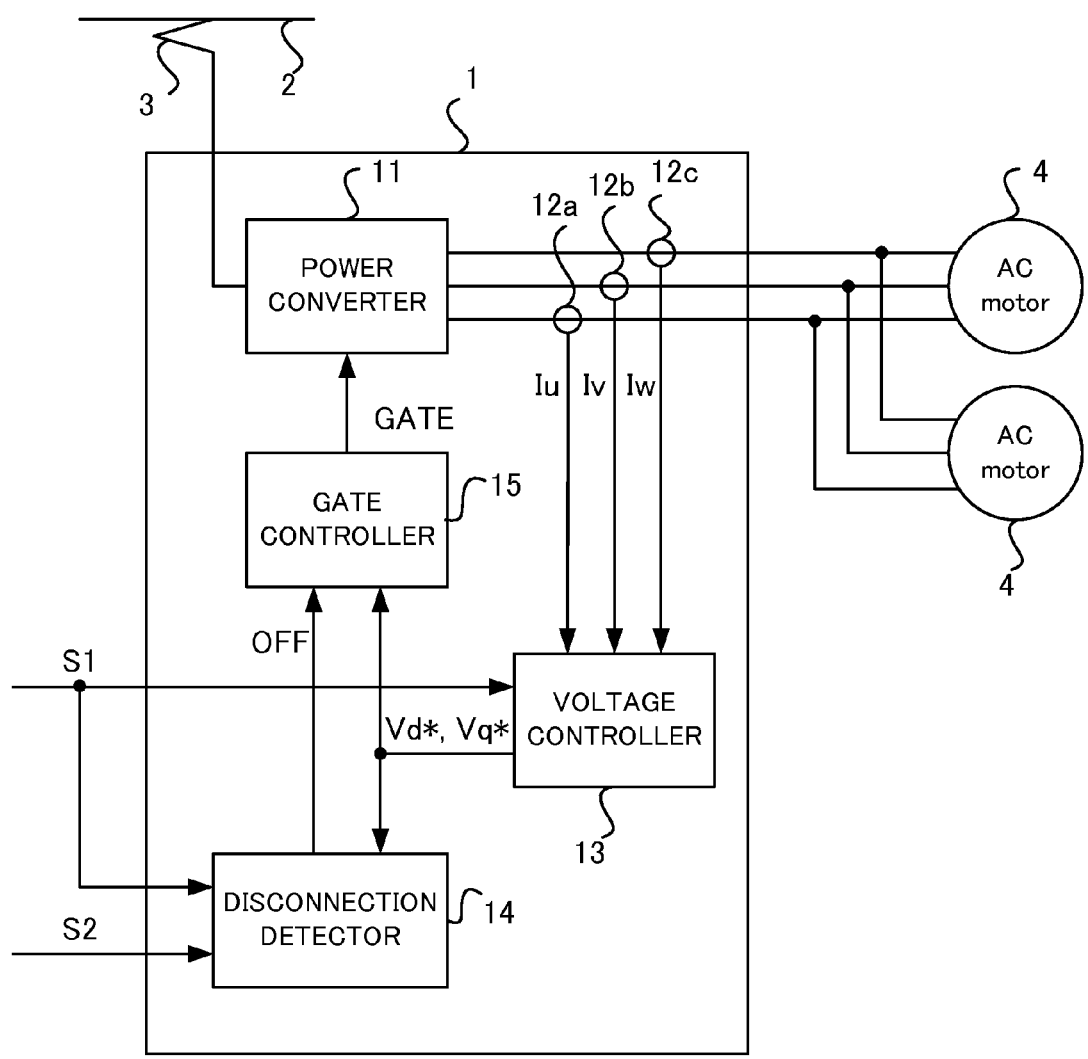
FIG. 1 is a block diagram illustrating an exemplary configuration of a control device according to an embodiment of the present disclosure.

Hereinafter, an exemplary embodiment of the present disclosure will be described in detail and with reference to the drawings. Note that in the drawings, the same signs are given to the same or similar parts.

FIG. 1 is a block diagram illustrating an exemplary configuration of a control device according to an embodiment of the present disclosure. FIG. 1 is an example of using the control device 1 in an electric train. The control device 1 takes in power from an overhead line 2 with a current collector 3, converts the power, and drives AC motors 4 with the converted power. The AC motors 4 are electric motors that produce driving force causing a car to run. In the example of FIG. 1, a three-phase induction motor is used as the AC motors 4. The control device 1 is equipped with a power converter 11, current detectors 12a, 12b, and 12c, a voltage controller 13, a disconnection detector 14, and a gate controller 15.

The power converter 11 converts acquired power into three-phase AC power to supply to the AC motors 4 by turning a switching element on and off on the basis of a gate command GATE output by the gate controller 15, and drives the AC motors 4. The current detectors 12a, 12b, and 12c respectively detect phase current values Iu, Iv, and Iw that the power converter 11 supplies to the AC motors 4, and send the detected values to the voltage controller 13. The current detectors 12a, 12b, and 12c are not limited to being current transformers (CT) that detect a current flowing through connection between the power converter 11 and the AC motors 4. Also, since the phase currents satisfy the relationship Iu+Iv+Iw=0, the current detector 12c may be omitted, for example, and the phase current Iw may be computed from the phase currents Iu and Iv respectively detected by the current detectors 12a and 12b.

A drive command signal S1 that commands rotating operation of the AC motors 4 is input into the voltage controller 13. On the basis of the drive command signal S1, the angular velocity and output torque of the AC motors 4 are determined, for example. The angular velocity of the AC motors 4 refers to the angular velocity of rotors in the AC motors 4. In the case of using the control device 1 in an electric train as in FIG. 1, the drive command signal S1 is a signal for controlling the travel of the train car, and includes a powering command signal and a brake command signal that are command signals from the driver's cab. The respective signal levels of the powering command signal and the brake command signal change according to the input or release of a powering command and a brake command in the driver's cab.

The voltage controller 13 uses technology of the related art to generate a d-axis current command value Id* and a q-axis current command value Iq* in a rotating coordinate on the basis of the drive command signal S1. Also, the voltage controller 13 uses technology of the related art to perform coordinate conversion of the phase currents Iu, Iv, and Iw from a driving coordinate defined for driving the AC motors 4 to the rotating coordinate, and generates a d-axis current Id and a q-axis current Iq in the rotating coordinate. The rotating coordinate is a coordinate that rotates in synchronization with a rotating magnetic field produced in the AC motors 4. The d-axis is the same direction as the main magnetic flux of the rotating magnetic field, while the q-axis is the direction orthogonal to the d-axis. If the AC motors 4 are three-phase induction motors, the driving coordinate is a coordinate having a U-phase axis, a V-phase axis, and a W-phase axis.

The voltage controller 13 generates and sends to the disconnection detector 14 and the gate controller 15 a d-axis voltage command value Vd* and a q-axis voltage command value Vq* on the basis of the d-axis current command value Id*, the q-axis current command value Iq*, the d-axis current Id, and the q-axis current Iq, so as to eliminate the deviation between the d-axis current command value Id* and the d-axis current Id, and the deviance between the q-axis current command value Iq* and the q-axis current Iq.

The drive command signal S1 and a velocity signal S2 that is a signal indicating the velocity of the car, are input into the disconnection detector 14. For the velocity signal S2, a car speed based on the angular velocity detected by an angular velocity sensor attached to an AC motor 4, or velocity information from automatic train control (ATC) may be used, for example. Also, a velocity calculator that computes the angular velocity of the AC motor 4 and computes the car velocity from the angular velocity on the basis of the d-axis voltage command value Vd*, the q-axis voltage command value Vq*, the d-axis current Id, the q-axis current Iq, and the primary resistance value of the AC motor 4 may be provided, and it may be configured so that the velocity computed by the velocity calculator is sent to the disconnection detector 14 as the velocity signal S2. The velocity signal S2 may also be taken to be the angular velocity detected by the angular velocity sensor or the angular velocity computed as above, and the disconnection detector 14 may be configured to compute the car velocity from the angular velocity.

The disconnection detector 14 determines that a disconnection between the power converter 11 and the AC motors 4 has occurred when a state in which the absolute value of the resultant vector of the d-axis voltage command value Vd* and the q-axis voltage command value Vq* is not in a predetermined range continues for a predetermined time or longer. The predetermined range is a function of the velocity of the car, for example. The predetermined time is an arbitrary time provided to prevent the misdetection of a disconnection due to variation in the d-axis voltage command value Vd* and the q-axis voltage command value Vq*.

The disconnection detector 14 sends a disconnection signal OFF to the gate controller 15. For example, the disconnection signal OFF is a signal at high (H) level when the disconnection detector 14 determines that a disconnection between the power converter 11 and the AC motors 4 has occurred, and low (L) level when the disconnection detector 14 determines that a disconnection between the power converter 11 and the AC motors 4 has not occurred.

When the disconnection signal OFF is at L level, the gate controller 15 sends to the power converter 11 a gate command GATE that controls the turning on and off of the switching element provided in the power converter 11 on the basis of the d-axis voltage command value Vd* and the q-axis voltage command value Vq*. When the disconnection signal OFF is at H level, the gate controller 15 sends to the power converter 11 a gate command GATE that turns off the switching element provided in the power converter 11. By turning off the switching element provided in the power converter 11, power supply to the AC motors 4 stops, making it possible to prevent overloading the AC motors 4.

Figure 2:
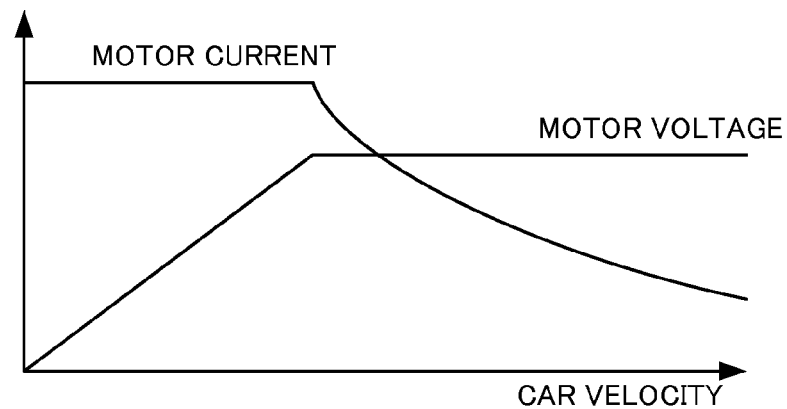
FIG. 2 is a diagram illustrating the relationship between motor voltage and motor current in the embodiment.

The operation of the disconnection detector 14 determining whether or not a disconnection between the power converter 11 and the AC motors 4 has occurred will be described hereinafter. FIG. 2 is a diagram illustrating the relationship between motor voltage and motor current in the embodiment. The absolute value of the resultant vector of the U-phase, V-phase, and W-phase voltages is called the motor voltage. Also, the absolute value of the resultant vector of the phase currents Iu, Iv, and Iw is called the motor current. Since the actual motor voltage cannot be detected, the absolute value of the resultant vector of the d-axis voltage command value Vd* and the q-axis voltage command value Vq* is treated as the motor voltage.

As illustrated in FIG. 2, immediately after the AC motors 4 start up, the motor current is kept constant, and after the car velocity exceeds a certain velocity, the motor current gradually decreases as the car velocity increases. After the AC motors 4 start up, the motor voltage gradually increases, and is kept constant after reaching a limit voltage. The limit voltage is a value determined according to the maximum value of the voltage that the power converter 11 is able to output.

Figure 3:
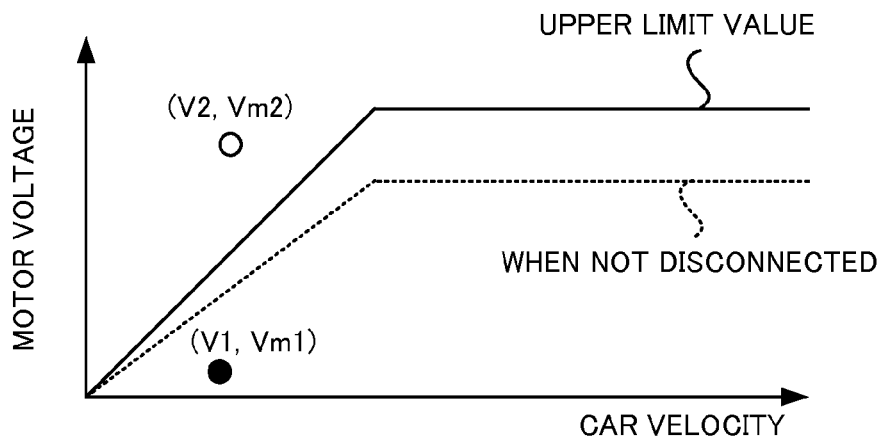
FIG. 3 is a diagram illustrating an example of a predetermined range of absolute values of a resultant vector of voltage command values in the embodiment.

During a period from when the AC motors 4 start up until the motor voltage reaches the limit voltage, if a state in which the motor voltage is not in a predetermined range continues for a predetermined time or longer, the disconnection detector 14 determines that a disconnection between the power converter 11 and the AC motors 4 has occurred. FIG. 3 is a diagram illustrating an example of a predetermined range of absolute values of the resultant vector of voltage command values in the embodiment. The range less-than-or-equal-to the value indicated by the solid line in FIG. 3 and greater than 0 is taken to be the predetermined range.

As illustrated in FIG. 1, in the case of a single control device 1 driving multiple AC motors 4, if the U-phase cable of one of the AC motors is disconnected, for example, the phase current Iu detected by the current detector 12a temporarily decreases. Since the control device 1 conducts vector control to keep the current supplied to the AC motors 4 constant, the values of the d-axis voltage command value Vd* and the q-axis voltage command value Vq* become larger. After that, when a state in which the absolute value of the resultant vector of the d-axis voltage command value Vd* and the q-axis voltage command value Vq* is not in the predetermined range continues for the predetermined time or longer, the disconnection detector 14 determines that a disconnection between the power converter 11 and the AC motors 4 has occurred.

As indicated by the black circle in FIG. 3, when the velocity of the car is V1 and the motor voltage is Vm1, the motor voltage is in the predetermined range. In this case, the disconnection detector 14 determines that a disconnection between the power converter 11 and the AC motors 4 has not occurred. As indicated by the white circle in FIG. 3, when the velocity of the car is V2 and the motor voltage is Vm2, the motor voltage is not in the predetermined range. If this state continues for the predetermined time or longer, the disconnection detector 14 determines that a disconnection between the power converter 11 and the AC motors 4 has occurred.

The upper limit value of the predetermined range is taken to be the value obtained by multiplying the motor voltage when a disconnection between the power converter 11 and the AC motors 4 has not occurred as indicated by the dashed line in FIG. 3 by a certain constant, for example. In addition, the upper limit value of the predetermined range may also be defined so that the difference between the upper limit value of the predetermined range and the motor voltage when the disconnection has not occurred increases by a constant ratio as the velocity of the car increases.

Since the disconnection detector 14 determines whether or not a disconnection between the power converter 11 and the AC motors 4 has occurred on the basis of the absolute value of the resultant vector of the d-axis voltage command value Vd* and the q-axis voltage command value Vq*, it is possible to detect a disconnection even when the cables for all phases of one AC motor 4 are disconnected. Also, when the cables for all phases of all AC motors 4 are disconnected, the absolute value of the resultant vector of the d-axis voltage command value Vd* and the q-axis voltage command value Vq* becomes 0, and thus by not including 0 in the predetermined range, it is possible to detect a disconnection even in such a case.

Since the way the motor voltage rises after the AC motors 4 start up differs depending on the type of drive command signal S1, a predetermined range may also be defined for each drive command.

Figure 4:
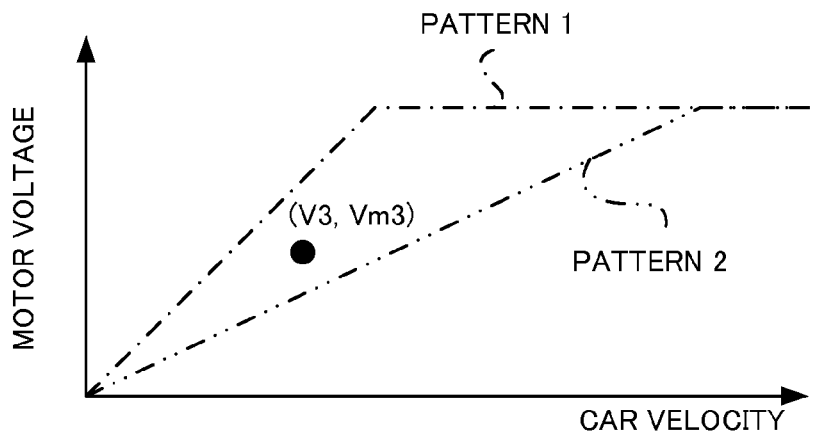
FIG. 4 is a diagram illustrating an example of predetermined ranges corresponding to drive commands in the embodiment.

FIG. 4 is a diagram illustrating an example of predetermined ranges corresponding to drive commands in the embodiment. For example, there are defined predetermined ranges that correspond respectively to cases in which there is a pattern 1 drive command signal S1 and a pattern 2 drive command signal S1. The drive command signal S1 includes types of signals such as a non-stepwise powering command signal and a stepwise powering command signal, for example. In FIG. 4, the plot of the single-dot chain line is the upper limit value of the predetermined range in the case in which the drive command signal S1 is the pattern 1, while the plot of the double-dot chain line is the upper limit value of the predetermined range in the case in which the drive command signal S1 is the pattern 2. When the drive command signal S1 is the pattern 1, the velocity of the car is V3, and the motor voltage is Vm3, the disconnection detector 14 determines that a disconnection between the power converter 11 and the AC motors 4 has not occurred.

On the other hand, when the drive command signal S1 is the pattern 2, the velocity of the car is V3, and the motor voltage is Vm3, the disconnection detector 14 determines that a disconnection between the power converter 11 and the AC motors 4 has occurred. By defining predetermined ranges corresponding to drive commands, it becomes possible to improve the accuracy of detecting a disconnection between the power converter 11 and the AC motors 4.

As described above, according to the control device 1 in accordance with the present embodiment, it becomes possible to improve the accuracy of detecting a disconnection between a power converter and an electric motor with a simple configuration.

The disconnection detector 14 may also be configured to not use the drive command signal S1. In this case, regardless of the type of drive command signal, if a state in which the absolute value of the resultant vector of the d-axis voltage command value Vd* and the q-axis voltage command value Vq* is not in a set predetermined range continues for a predetermined time or longer, there is determined to be a disconnection between the power converter 11 and the AC motors 4.

In addition, in the case of determining a disconnection between the power converter 11 and the AC motors 4, the disconnection detector 14 may be configured to output the disconnection signal OFF to outside of the control device 1 rather than to the gate controller 15. For example, it may be configured so that the disconnection signal OFF is sent to a display device in the driver's cab to notify the driver that there is a disconnection between the power converter 11 and the AC motors 4.

The AC motors 4 are not limited to three-phase induction motors, and may also be single-phase induction motors. Also, the number of AC motors 4 is not limited to being plural, and may also be 1. The AC motors 4 may be induction motors or rotary motors. A configuration using linear induction motors, linear synchronous motors, solenoids, or the like instead of the AC motors 4 is also possible.

The AC motors 4 driven by the control device 1 are not limited to being electric motors that produce driving force causing a car to run. The predetermined range may also be a function of the angular velocity of the AC motor 4 rather than a function of the velocity of the car. In this case, the velocity signal S2 input into the disconnection detector 14 is the angular velocity of the AC motor 4. Subsequently, the disconnection detector 14 judges that there is a disconnection between the power converter 11 and the AC motors 4 when a state in which the absolute value of the resultant vector of the d-axis voltage command value Vd* and the q-axis voltage command value Vq* is not in the predetermined range, that is, a function of the angular velocity of the AC motors 4, continues for the predetermined time or longer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure may be implemented suitably in a control device that controls a power converter that converts power for driving an electric motor, and detects a disconnection between the power converter and the electric motor.

REFERENCE SIGNS LIST 1 control device
2 overhead line
3 current collector
4 AC motor
11 power converter
12a, 12b, 12c current detector
13 voltage controller
14 disconnection detector
15 gate controller

The invention claimed is:

1. A control device comprising:
a power converter that converts input power and drives an AC motor by turning a switching element on and off;
a current detector that detects a current that the power converter outputs to the AC motor;
a voltage controller that generates voltage command values to use for control of the power converter, on the basis of a drive command that commands rotating operation of the AC motor, and the current detected by the current detector;
a disconnection detector that acquires an angular velocity of the AC motor, and determines that a disconnection between the power converter and the AC motor has occurred if a state in which, during a period from when the AC motor starts up until an absolute value of a resultant vector of the voltage command values reaches a value determined according to a maximum value of voltage that the power converter is able to output, the absolute value is not in a predetermined range continues for a predetermined time or longer, the predetermined range being a function of the angular velocity, an upper limit value of the predetermined range being a value obtained by multiplying, with a predetermined value, the absolute value when the AC motor is driven while in a state in which a disconnection between the power converter and the AC motor has not occurred; and
a gate controller that outputs a gate command for controlling the turning on and off of the switching element provided in the power converter, on the basis of the voltage command values and a determination by the disconnection detector that a disconnection between the power converter and the AC motor has occurred.

2. The control device according to claim 1, wherein
the AC motor is an electric motor that produces driving force causing a car to run,
the voltage controller uses a drive command controlling travel of the car as the drive command, and
the disconnection detector acquires a velocity of the car, and determines that a disconnection between the power converter and the AC motor has occurred if a state in which an absolute value of a resultant vector of the voltage command values is not within a predetermined range, the predetermined range being a function of the velocity of the car, continues for a predetermined time or longer.

3. The control device according to claim 1, wherein
the power converter drives a plurality of three-phase electric motors, and
the current detector detects a current output by the power converter in each of three phases.

4. The control device according to claim 2, wherein
the power converter drives a plurality of three-phase electric motors, and
the current detector detects a current output by the power converter in each of three phases.

* * * * *